United States Patent [19]

Smalheiser

[11] Patent Number: 4,519,994
[45] Date of Patent: May 28, 1985

[54] PROCESS FOR ABSORPTION OF SO₂ INTO PHOSPHATE ABSORBENT

[75] Inventor: Lawrence A. Smalheiser, Spring Valley, N.Y.

[73] Assignee: Stauffer Chemical Company, Westport, Conn.

[21] Appl. No.: 584,223

[22] Filed: Feb. 27, 1984

[51] Int. Cl.³ ............................................. C01B 17/00
[52] U.S. Cl. .................................................... 423/242
[58] Field of Search ............... 423/242 A, 242 R, 243, 423/244 A, 244 R

[56] References Cited

U.S. PATENT DOCUMENTS

| 3,633,339 | 1/1972 | Wiewiorowski et al. | 423/242 |
| 3,911,093 | 10/1975 | Sherif et al. | 423/242 |
| 3,960,687 | 6/1976 | Bakke et al. | 423/242 X |
| 3,969,492 | 7/1976 | Witte et al. | 423/242 |
| 4,080,423 | 3/1978 | Smith et al. | 423/210 |
| 4,211,761 | 7/1980 | Tung | 423/539 |

*Primary Examiner*—Gregory A. Heller
*Attorney, Agent, or Firm*—Richard P. Fennelly

[57] ABSTRACT

Higher loadings of $SO_2$ into an aqueous phosphate absorbent are achieved by use of a pH of no less than about 4.5 and a molarity (e.g., 3.0 or above) which produces a greater $SO_2$ absorption than expected.

6 Claims, 1 Drawing Figure

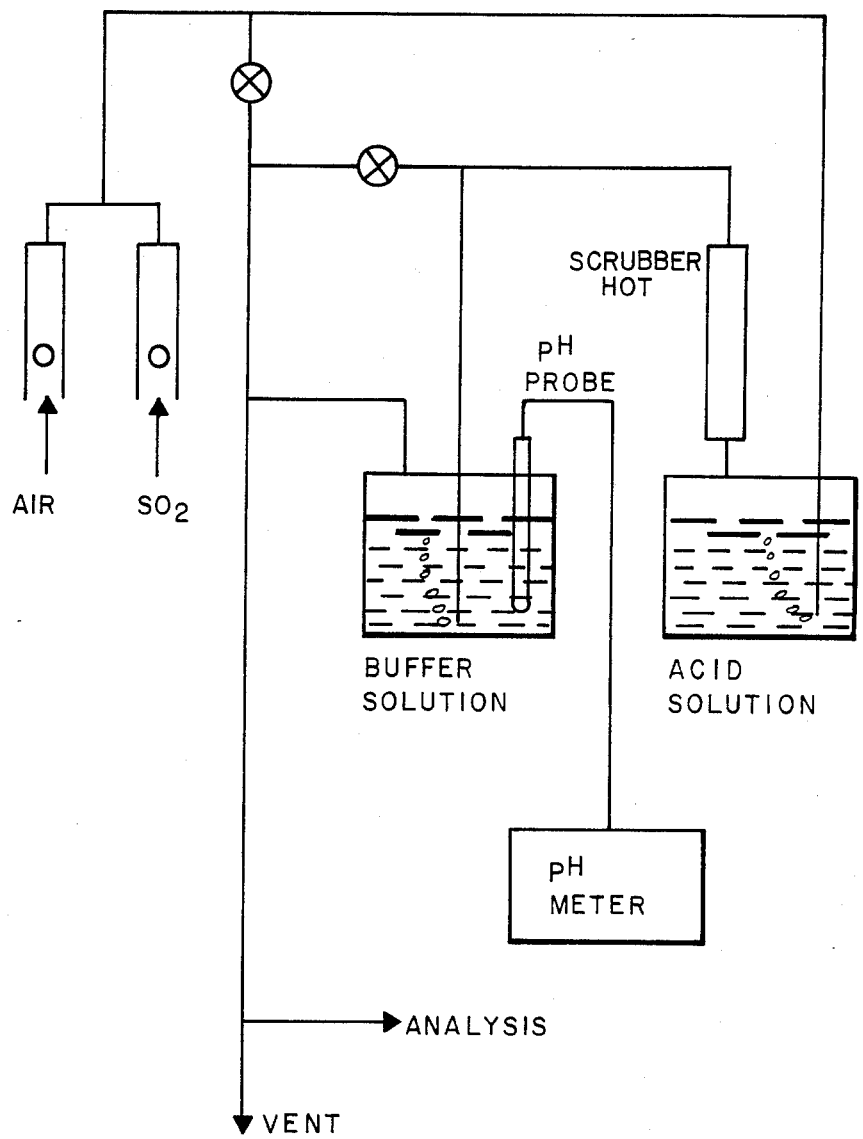

PROCESS FOR ABSORPTION OF $SO_2$ INTO PHOSPHATE ABSORBENT

BACKGROUND OF THE INVENTION

In U.S. Pat. No. 3,911,093 to F. G. Sherif et al., a process for reacting $SO_2$ and $H_2S$ in an aqueous phosphate absorbent is described in which elemental sulfur is produced. The molarity for the phosphate buffer is said to range from 0.5-2.0 with an exemplification of a maximum of 1.5 molar. The pH range is given as 2.5 to 5, preferably 2.8 to 4.5.

SUMMARY OF THE INVENTION

Unexpectedly, it has been found that at pH values at no less than about 4.5, it is possible to produce a higher $SO_2$ loading than expected if the molarity and pH values of the phosphate absorbent are suitably adjusted to achieve such a result. In general, use of higher molarities allow the enhanced effect to be seen at pH values closer to 4.5, whereas use of lower molarities require the use of higher pH values. The $SO_2$ loadings observed are greater than the calculated values for such conditions.

DETAILED DESCRIPTION OF THE PRESENT INVENTION

The phosphate absorbent process to which the current invention is an improvement utilizes an alkali metal phosphate absorbent for $SO_2$ gas. The phosphate absorbent preferably comprises a mixture of $Na_2HPO_4$ and $NaH_2PO_4$ as shown in the Sherif et al. patent. The absorption temperature can range from about 10° C. to about 95° C.

In accordance with the present invention, the pH of the absorbent is kept at no less than about 4.5, preferably from about 4.5 to about 7.0 and the molarity of the phosphate absorbent is selected so an unexpected increase in $SO_2$ absorption is achieved. At lower molarity values, e.g., about 1.0, the pH needs to be somewhat higher (e.g., about 5.5) than if higher molarity values are used (e.g., 3.0 or higher) in which an enhanced effect is also seen at somewhat lower pH values as well (e.g., down to about 4.5). In general, the greatest enhancement in $SO_2$ absorption is seen as the molarity of the absorbent is increased and as the pH is increased. The greatest percentage increase of $SO_2$ absorbent is noted for more dilute $SO_2$-containing streams.

The $SO_2$-rich absorbent resulting from the absorption of $SO_2$ into the absorbent is then treated with $H_2S$ to form sulfur, the sulfur is separated from the solution, and the lean absorbent is recycled to the $SO_2$ absorption step as described in U.S. Pat. No. 3,911,093.

The following Examples illustrate the present invention in more detail.

EXAMPLE 1

This Example describes the general procedure used to generate the data in the later Examples.

The apparatus used is shown in the FIGURE which forms a part of the present invention. Air and $SO_2$ were metered through flowmeters and fed through glass lines joined with minimum length tubing (TYGON brand). Stopcocks were used to control the gas flow path. The gases were passed through a vent tube at which point a side stream was taken for measurement of $SO_2$ concentration by the Reich test which consists of aspirating the gas through a known quantity of standard iodine solution to a starch endpoint.

During an absorption cycle, the gases passed through two absorption flasks which were thermostated in a water bath at the desired test temperature. The first flask contained phosphoric acid, and the second contained phosphoric acid neutralized to the desired initial pH. The solutions in both flasks had the same phosphate molarity. The purpose of the first flask (unneutralized phosphoric acid) was to hydrate the gas mixture so that water (as vapor) would not be removed from the flask containing the buffer solution. A heated scrubber (20.32 cm. hgt. by 2.54 cm. diam.) filled with gas beads removed any phosphoric acid that might have been entrained in the gas stream. Both flasks were equipped with open tube spargers.

A combination pH electrode was inserted in the buffer solution to monitor pH change, since as $SO_2$ was absorbed, the pH gradually would fall. When the pH was stable for 30 minutes, saturation of the buffer by $SO_2$ was assumed to be complete.

To avoid loss of $SO_2$ during sampling for analysis, the flask containing the buffer saturated with $SO_2$ was rapidly stoppered and cooled to room temperature. A pipet was used to remove samples for testing.

The analysis of $SO_2$ in the gas stream was done by the Reich test. A slip stream of the gas stream under test was bubbled through an iodine—starch solution (i.e., 1–10 ml. of a 0.1N iodine solution in about 400–600 ml. of water in a 1 liter Ehrlenmeyer flask equipped with a magnetic stirrer). At the disappearance of the iodine-starch color, the volume of gas passed through the solution was measured by means of a liquid filled burette and leveling bulb (previously set to zero at the start of the run). The following equation was used to calculate the $SO_2$ concentration:

$$SO_2 \text{ ppm} = \frac{(N_I \times ml._I) \times 12,123,000}{\text{ml. air burette} - (0.0268 \times \text{ml. air}) + N_I \times (ml_I \times 12.123)}$$

where
$N_I$ = the normality of the iodine solution
$ml_I$ = milliliters of iodine solution
air = air in burette which represents the volume of gas passed through the iodine solution for decolorization at a nominal 22.5° C.

The appropriate volume of iodine solution is:

| ml of 0.1 N $I_2$ | Vol. of gas (ml.) | $SO_2$ (ppm) |
| --- | --- | --- |
| 1.0 | 400 | 3000 |
| 1.0 | 150 | 8000 |
| 5.0 | 120 | 50,000 |
| 10.0 | 170 | 70,000 |
| 10.0 | 135 | 85,000 |

EXAMPLE 2

This Example illustrates how the calculated values for $SO_2$ solubility reported in later Examples was measured.

The equation relating concentration in solution of $SO_2$ and buffer, pH, and dissociation constants for sulfurous acid and buffer acid is given as Equation 1. The dissociation constants for water, sulfurous acid and phosphoric acid are given as Equations 2a to 2c. The relationship between $SO_2$ concentration in solution and in gas is given as equation 3 along with Henry's constant (equation 3a).

$$[H^+] + [Na] =$$ Equation 1

$$\left[\frac{K_1[H^+] + 2K_1K_2}{[H^+]^2 + K_1[H^+] + K_1K_2}\right] \text{(total SO}_2 \text{ in solution)} +$$

$$\left[\frac{K_3[H^+]^2 + 2K_3K_4[H^+] + 3K_3K_4K_5}{[H^+]^3 + K_3K_4K_5 + [H^+]K_3K_4 + [H^+]^2K_3}\right] \text{(total buffer in solution)} +$$

$$\frac{Kw}{[H^+]}$$

where
$K_1K_2$ = dissociation constants for $H_2SO_3$
$K_3K_4K_5$ = dissociation constants for $H_3PO_4$
$Kw$ = dissociation constant for water
[ ] = molar concentrations Equation 2a (Dissociation Constant $H_2O$)

$$\log Kw = \frac{-4470.99}{T°K.} + 6.0875 - 0.1706 (T°K.)$$

For: 0° to 50° C.
Reference: W. Stumm, J. J. Morgan, Aquatic Chemistry, P. 76

Equation 2b (Dissociation Constants—Sulfurous Acid)

$$\ln K_1 = 122.53 - \frac{3768}{T°K.} - 20 \ln T°K.$$

$$\ln K_2 = \frac{1333.4}{T°K.} - 21.274$$

For: 0° to 100° C.
Reference: S. A. Newman, Thermodynamics of Aqueous Systems with Industrial Applications, 1979, pp 139–172 (ACS Symposium Series No. 133)

Equation 2c (Dissociation Constants—Phosphoric Acid)

$$\log K_3 = \frac{-799.3}{T°K.} + 4.5535 - 0.13486 (T°K.)$$

$$\log K_4 = \frac{-2073}{T°K.} + 5.9884 - 0.20912 (T°K.)$$

$$\log K_5 = 4.8 \times 10^{-13}$$

For: 0° to 60° C.
Reference: Mellor, Inorganic and Theoretical Chemistry, Vol. VIII, Supplement III, p. 697.

Equation 3

$$SO_2 \text{ in gas, ppm,} = \frac{[\text{total SO}_2 \text{ in solution}]}{K_H[1 + K_1 10^{pH} + K_1K_2 10^{2pH}]}$$

Equation 3a $$K_H = \frac{-5578.8}{T°K.} - 8.76152(\ln T°K.) + 68.418$$

For: 0° to 100° C.
Reference: Same as Equation 2b

EXAMPLE 3

The solubility of $SO_2$ in phosphate buffer at 1, 2 and 3 molar at 65.6° C. was measured for various feed gases:

| | Run No. | | | |
|---|---|---|---|---|
| | 1 | 2 | 3 | 4 |
| Phosphate Molarity | 1.0 | 1.0 | 1.0 | 3.0 |
| Added $S_2O_3^=$ (gm.) | 0 | 0 | 15 | 0 |
| Added $SO_4^=$ (gm.) | 0 | 65 | 65 | 0 |
| % $SO_2$ in Air | 6.91 | 8.64 | 7.88 | 0.87 |
| $SO_2$ solubility (gm/l.) | | | | |
| Found | 10.4 | 12.2 | 12.0 | 6.35 |
| Calculated | 13.3 | 15.0 | 14.3 | 7.44 |
| % Found/Calc. | 78.2 | 81.3 | 83.9 | 85.4 |
| End pH | 2.96 | 2.90 | 2.89 | 3.80 |
| | Run No. | | | |
| | 5 | 6 | 7 | 8 |
| Phosphate Molarity | 3.0 | 2.0 | 2.0 | 2.0 |
| Added $S_2O_3^=$ (gm.) | 15 | 0 | 15 | 0 |
| Added $SO_4^=$ (gm.) | 65 | 0 | 65 | 0 |
| % $SO_2$ in Air | 8.10 | 5.06 | 5.02 | 4.98 |
| $SO_2$ solubility (gm./l.) | | | | |
| Found | 23.9 | 14.8 | 15.5 | 14.8 |
| Calculated | 24.2 | 15.6 | 15.6 | 15.6 |
| % Found/Calc. | 98.8 | 94.9 | 99.4 | 94.9 |
| End pH | 3.22 | 3.19 | 3.15 | 3.16 |

The addition of $S_2O_3^=$ and $SO_4^=$ had no substantial effect on the solubility of $SO_2$. The correlation between observed and calculated $SO_2$ values was good. In all cases, the initial pH was about 4.5.

EXAMPLE 4

The effect of phosphate molarity on $SO_2$ solubility at 65.6° C. was calculated and the following results were obtained:

| % $SO_2$ in Air | Buffer Molarity | Calc. $SO_2$ Solubil. (gm/l.) | % Increase $SO_2$ Solubil. over 1 Molar |
|---|---|---|---|
| 1.0 | 1.0 | 4.8 | — |
| | 2.0 | 6.6 | 38 |
| | 3.0 | 8.0 | 67 |
| 5.0 | 1.0 | 11.2 | — |
| | 2.0 | 15.5 | 38 |
| | 3.0 | 18.8 | 68 |
| 8.0 | 1.0 | 14.3 | — |
| | 2.0 | 19.9 | 39 |
| | 3.0 | 24.1 | 68 |

EXAMPLE 5

$SO_2$ solubility was measured at 65.6° C. at an initial pH of 4.6–4.73 as follows:

| | Run No. | | |
|---|---|---|---|
| | 1 | 2 | 3 |
| Phosphate Molarity | 5.0 | 5.0 | 7.5 |
| % $SO_2$ in Air | 0.84 | 7.24 | 7.88 |
| $SO_2$ Solubil. (gm/l.) | | | |
| Found | 17.2 | 35.1 | 47–50* |
| Calculated | 9.2 | 29.0 | 37.7 |
| % Found/Calculated | 187 | 121 | 130 |
| Final pH | | | |
| Found | 4.13 | 3.58 | 3.98 |

-continued

| | Run No. | | |
|---|---|---|---|
| | 1 | 2 | 3 |
| Calculated | 3.83 | 3.38 | 3.46 |

*presence of crystals of sodium phosphate precluded more accurate analysis.

A positive deviation from calculated values was observed at initial pH values about 4.5, i.e., for 5.0 and 7.5 molar. The greatest degree of positive deviation was observed for the most dilute $SO_2$ gas stream (Run No. 1).

EXAMPLE 6

The $SO_2$ absorption from a 3000 ppm gas stream at an initial pH of about 4.5 and 23.9° C. was measured at molarities of about 1–5 as follows:

| Run No. | 1 | 2 | 3 | 4 | 5 | 6 |
|---|---|---|---|---|---|---|
| Phosphate Molarity | 1 | 2 | 3 | 3.5 | 4 | 5 |
| $SO_2$ Solubility (gm/l.) | | | | | | |
| Found | 2.5 | 5.2 | 10.8 | 10.9 | 18.3 | 17.6 |
| Calculated | 3.5 | 4.9 | 5.9 | 6.4 | 6.8 | 7.5 |
| Final pH | | | | | | |
| Found | 3.23 | 3.56 | 3.99 | 3.90 | 4.06 | 4.21 |
| Calculated | 3.49 | 3.64 | 3.72 | 3.75 | 3.78 | 3.82 |

These data illustrate the positive deviation from calculated values for $SO_2$ absorption when buffers above two molar were used and when a relatively dilute gas stream is used (i.e., one more dilute than any used in Example 3).

EXAMPLE 7

Solubility data were developed for three molar phosphate absorbents at 65.6° C. for an air feed containing about 7.78% $SO_2$:

| | Initial pH | | $SO_2$ Absorbed (gm/liter) | |
|---|---|---|---|---|
| Run | Ambient | 65.6° C. | Found | Calculated |
| A | 6.00 | 5.84 | 88.0 | 29.5 |
| B | 5.50 | 5.56 | 64.8 | 26.2 |
| C | 5.00 | 5.10 | 44.0 | 24.7 |
| D | 4.50 | 4.69 | 23.9 | 24.2 |

These data illustrate the positive deviation from calculated values for $SO_2$ absorption at pH values above 4.5 for 3 molar phosphate buffer solutions. A greater degree of $SO_2$ absorption was observed for the higher pH values.

EXAMPLE 8

This Example illustrates the results obtained when a 3000 ppm $SO_2$ gas stream was treated with 3 molar phosphate absorbent at 48.8° C. and an initial pH of 6.0. The calculated and actual $SO_2$ loadings were:

| | $SO_2$ (gm/l.) |
|---|---|
| Calculated | 14.46 |
| Found | 61.5 |

This illustrates use of the present invention with a relatively dilute $SO_2$ gas stream at an initial pH of 6.0 with three molar phosphate.

EXAMPLE 9

This Example illustrates the solubility of $SO_2$ in phosphate buffer at about 65.6° C. under a variety of conditions. The results are as follows:

| Phosphate Molarity | $SO_2$ Conc. ppm | Initial pH | $SO_2$ Absorption (gm/l.) | |
|---|---|---|---|---|
| | | | Found | Calculated |
| 1.0 | 75,000 | 5.0 | 12.7 | 14.2 |
| | | 5.5 | 18.4 | 14.7 |
| | | 6.0 | 26.6 | 16.2 |
| 2.0 | 74,000 | 5.0 | 25.3 | 19.7 |
| | | 5.5 | 35.8 | 20.7 |
| | | 6.0 | 51.2 | 23.7 |
| 3.0 | 78,000 | 5.0 | 44.0 | 24.7 |
| | | 5.5 | 64.8 | 26.2 |
| | | 6.0 | 88.0 | 29.2 |

The above data illustrate the positive deviation from calculated $SO_2$ absorption obtained for a number of the runs. The use of lower molarity phosphate solutions (e.g., 1.0 molar) dictates use of a somewhat higher pH (e.g., 5.5) than needed if higher phosphate molarity is employed.

The foregoing Examples illustrate certain embodiments of the claimed invention and should not therefore be construed in a limiting sense. The scope of protection that is sought is set forth in the claims which follow.

What is claimed is:

1. A method of absorbing sulfur dioxide wherein sulfur dioxide is absorbed into an absorbent comprising an aqueous solution of an alkali metal phosphate, wherein said method comprises utilizing a pH for the phosphate of no less than about 4.5 and adjusting the molarity of the phosphate absorbent so as to yield an increased absorption of sulfur dioxide in the absorbent.

2. A method as claimed in claim 1 wherein the pH ranges from about 4.5 to about 7.0.

3. A method as claimed in claim 1 wherein the molarity of phosphate is about 1.0 or above.

4. A method as claimed in claim 1 wherein the molarity of phosphate is about 3.0 or above.

5. A method as claimed in claim 1 wherein the pH ranges from about 4.5 or above and the molarity of phosphate is about 3.0 or above.

6. A method as claimed in claim 1 wherein the pH ranges from about 5.5 or above and the molarity of phosphate is about 1.0 or above.

* * * * *

UNITED STATES PATENT AND TRADEMARK OFFICE
CERTIFICATE OF CORRECTION

PATENT NO. : 4,519,994
DATED : May 28, 1985
INVENTOR(S) : Lawrence A. Smalheiser It is certified that error appears in the above—identified patent and that said Letters Patent is hereby corrected as shown below:

Col. 3, line 47, the portion of the equation reading "0.13486" should read -- 0.013486 --;

Col. 3, line 50, the portion of the equation reading "0.20912" should read -- 0.020912 --; and Claim 1, line 5, the word -- absorbent -- should appear after "phosphate".

Signed and Sealed this

Twentieth Day of August 1985

[SEAL]

Attest:

DONALD J. QUIGG

Attesting Officer          Acting Commissioner of Patents and Trademarks

UNITED STATES PATENT AND TRADEMARK OFFICE
CERTIFICATE OF CORRECTION

PATENT NO. : 4,519,994

DATED : May 28, 1985

INVENTOR(S) : Lawrence A. Smalheiser

It is certified that error appears in the above—identified patent and that said Letters Patent is hereby corrected as shown below:

Col. 2, line 13, "gas" should be -- glass --;

Signed and Sealed this

Fifteenth Day of October 1985

[SEAL]

Attest:

DONALD J. QUIGG

Attesting Officer

Commissioner of Patents and Trademarks—Designate